US011365317B2

(12) United States Patent
Vincent

(10) Patent No.: US 11,365,317 B2
(45) Date of Patent: Jun. 21, 2022

(54) SOLID BINDERS

(71) Applicant: TOTAL MARKETING SERVICES, Puteaux (FR)

(72) Inventor: Régis Vincent, Puteaux (FR)

(73) Assignee: TOTAL MARKETING SERVICES, Puteaux (FR)

( * ) Notice: Subject to any disclaimer, the term of this patent is extended or adjusted under 35 U.S.C. 154(b) by 208 days.

(21) Appl. No.: 16/464,740

(22) PCT Filed: Dec. 6, 2017

(86) PCT No.: PCT/FR2017/053412
§ 371 (c)(1),
(2) Date: May 29, 2019

(87) PCT Pub. No.: WO2018/104659
PCT Pub. Date: Jun. 14, 2018

(65) Prior Publication Data
US 2019/0382583 A1 Dec. 19, 2019

(30) Foreign Application Priority Data
Dec. 7, 2016 (FR) ...................................... 1662030

(51) Int. Cl.
*C08L 95/00* (2006.01)
(52) U.S. Cl.
CPC ........... *C08L 95/00* (2013.01); *C08L 2555/74* (2013.01)
(58) Field of Classification Search
CPC .............................. C08L 95/00; C09D 195/00
USPC ..................................................... 106/284.4
See application file for complete search history.

(56) References Cited

U.S. PATENT DOCUMENTS

| 3,026,568 A | 3/1962 | Moar |
| 4,279,579 A | 7/1981 | Froeschke |
| 4,305,812 A | 12/1981 | Shih et al. |
| 4,455,216 A | 6/1984 | Angevine et al. |
| 2004/0069685 A1 | 4/2004 | Inomata et al. |
| 2010/0192804 A1 | 8/2010 | Lapalu et al. |
| 2011/0290695 A1 | 12/2011 | Thomas |
| 2013/0041075 A1* | 2/2013 | Harders ............ C08K 5/20 524/68 |
| 2016/0304793 A1 | 10/2016 | Merdrignac et al. |
| 2017/0218177 A1 | 8/2017 | Vincent et al. |

FOREIGN PATENT DOCUMENTS

| JP | 02169669 A * | 6/1990 | ........... C04B 41/478 |
| JP | H02-169669 A | 6/1990 | |
| WO | 2004/020532 A1 | 3/2004 | |
| WO | 2007/128636 A2 | 11/2007 | |
| WO | 2008/022836 A1 | 2/2008 | |
| WO | 2008/043635 A1 | 4/2008 | |
| WO | 2008/141930 A1 | 11/2008 | |
| WO | 2008/141932 A1 | 11/2008 | |
| WO | 2009/015969 A1 | 2/2009 | |
| WO | 2009/071467 A1 | 6/2009 | |
| WO | 2009/153324 A1 | 12/2009 | |
| WO | 2010/028261 A2 | 3/2010 | |
| WO | 2011/000133 A1 | 1/2011 | |
| WO | 2012/168380 A1 | 12/2012 | |

OTHER PUBLICATIONS

Okesola et al., Soft Matter, (2015), v11, p. 4768-4787.*
Pitch (resin), Wikipedia, downloaded Feb. 11, 2021.*
Brunauer, Stephen et al. "Adsorption of Gases in Multimolecular Layers". J. Am. Chemical Society, vol. 60, pp. 309-319, 1938.
Lee, Jung M. et al, "Separation of Solvent and Deasphalted Oil for Solvent Deasphalting Process". Fuel Processing Technology, vol. 119, pp. 204-210, 2014.
Feb. 13, 2018 International Search Report issued in International Patent Application No. PCT/FR2017/053412.
Feb. 13, 2018 Written Opinion of the International Searching Authority issued in International Patent Application No. PCT/FR2017/053412.

* cited by examiner

*Primary Examiner* — Yong L Chu
(74) *Attorney, Agent, or Firm* — Oliff PLC

(57) ABSTRACT

The invention relates to the use of a binder, in divided form, that is solid at ambient temperature, including at least one oil selected from a hydrocarbon oil of petroleum or synthetic origin and mixtures of same, and at least one chemical organogelator additive, for the production of asphalt mixes from recycled asphalt mix aggregates. The solid-at-ambient-temperature binder can be used for the production of asphalt mixes obtained from recycled asphalt mix aggregates, said binder including at least one oil selected from a hydrocarbon oil of petroleum or synthetic origin and mixtures of same, at least one pitch and at least one chemical organogelator additive.

18 Claims, No Drawings

SOLID BINDERS

TECHNICAL FIELD

The present invention relates to binders based on oil and optionally pitch, which are solid when cold and in divided form, and to the use thereof as rejuvenating agent for the production of coatings from aggregates originating from recycled mixes. The invention also relates to a process for transporting and/or storing and/or handling binders which are solid when cold and in divided form.

PRIOR ART

The invention is directed toward facilitating and improving the use of aggregates obtained from recycled bituminous mixes during the manufacture of new bituminous surfacing mixes. Aggregates originating from recycled bituminous mixes are materials derived from the operation for renovation of a bituminous coating layer, such as coatings for roads, sidewalks or sports pitches, which are essentially composed of a bituminous binder and granulates. More specifically, the aggregates obtained from recycled bituminous mixes are derived from the operation for refurbishment of a bituminous coating which may be either the rolling layer or one of the structural layers. Aggregates originating from recycled bituminous mixes are essentially composed of granulates and of bituminous binder residues adhering to these granulates. Bituminous binder residues are also known as aged bituminous binders. The formulation of new bituminous surfacing mixes from these recycled materials poses problems: the presence of solidified bituminous residues, of varied origins and/or compositions, affords sparingly homogeneous compositions, with mixtures of bituminous materials which have nonuniform softening points and penetrabilities. The size distribution of recycled aggregates may be broad and constitutes an obstacle to producing a homogeneous regenerated material. The aging of the bituminous binder also leads to a modification of its properties relative to a freshly prepared bituminous binder composition, notably lower penetrability and a higher softening point than that of the original material.

The rejuvenating agent must make it possible to adjust both the consistency and the chemical constitution of the bituminous binder present in the aggregates obtained from recycled mixes. It facilitates the remobilization of the aged bituminous binders present in the aggregates originating from bituminous mixes, i.e. it mixes easily with the aged bituminous binder and the granulates which together form the recycled aggregates. This mixing gives surfacing mixes in which the bituminous binder once again has a consistency and a chemical constitution which allow it to have the expected mechanical properties. The rejuvenating agent must make it possible to formulate a composition in which the binder has a satisfactory softening point and penetrability.

Oil-based binder compositions, optionally supplemented with pitch, are usually used as rejuvenating agents for aggregates obtained from recycled mixes.

The transportation of these binders is nowadays performed by heat-insulated tanker trucks or in ISO containers allowing heating by means of a heat-transfer fluid or a steam network. The user must be equipped with storage tanks that are also kept hot until the binder is used. These constraints entail substantial energy costs and equipment costs, both for the binder supplier and for its client. In addition, keeping the binder maintained at elevated temperature for a given period may affect the properties of the binder, notably the aging properties, and thus change the final performance qualities of the products into which the binder is incorporated.

It is known that organogelator compounds of low molecular masses allow the heat-reversible gelling of liquids. However, it is not possible to predict which organogelator compounds is capable of solidifying which liquid. In addition, the presence of an organogelator compound in a liquid has an influence on the properties of this liquid, and the aim of the invention is to formulate a binder based on oil and optionally pitch, which is solid at room temperature, without its working properties, in particular its properties as rejuvenating agent in the production of coatings from recycled aggregates, being modified by the presence of the additives allowing its solidification.

WO 2008/107551 teaches bitumen compositions comprising an additive of organogelator type and having heat-reversible viscosity and hardness characteristics. It is known practice, notably from WO 2016/016320, to use organogelators for conditioning bitumens in solid form when cold and in divided form. However, the composition of a bitumen is very remote from that of a binder based on oil and optionally pitch, and the targeted applications are very different.

JP 02 169669 discloses the preparation of bituminous compositions in which the olfactory intensity and the amount of fumes released during their heating are reduced. The bituminous compositions comprise bitumen, a styrene-based thermoplastic elastomer and dibenzylidene sorbitol.

The aim of the present invention is to propose a binder based on oil and optionally pitch, which may be used as rejuvenating agent in the production of coatings from aggregates originating from recycled bituminous mixes, which is in divided form and in solid form at room temperature and which can be rendered fluid by simple heating. In particular, one aim of the invention is to propose a binder based on oil and optionally a pitch, which is in divided form and in solid form at room temperature, and which can be mixed with aggregates obtained from recycled bituminous mixes in order to produce bituminous coatings. Notably, it is desired to develop a binder based on oil and optionally pitch, which is in solid form and in divided form, comprising an organogelator compound whose presence does not significantly modify the working properties of the rejuvenating composition or of the rejuvenating binder, or the properties of the bituminous coating compositions into which it is incorporated.

An object of the invention is also to propose a process for transporting and/or storing and/or handling at room temperature a binder which is in solid form and in divided form.

Another object of the invention is to propose a process for the easy handling of the binder during material handling operations.

Another object of the invention is to propose an ecological and economical process for transporting a binder and for avoiding the use of additional means for maintaining this binder at elevated temperature during its transportation and/or storage and/or handling.

SUMMARY OF THE INVENTION

The invention relates to a binder which is solid at room temperature, comprising:
- at least one oil chosen from a hydrocarbon-based oil of petroleum or synthetic origin and mixtures thereof,
- at least one pitch,
- at least one organogelator chemical additive.

According to a preferred embodiment, the hydrocarbon-based oil is chosen from hydrocarbon-based oils of petroleum origin.

According to a first preferred variant, the hydrocarbon-based oil is chosen from aromatic oils with a content of aromatic compounds of between 30% and 95% by mass, advantageously between 50% and 95% by mass, more advantageously between 60% and 95% by mass relative to the total mass of the aromatic oil.

According to a preferred embodiment of this variant, the aromatic oil has a kinematic viscosity at 100° C. of between 0.1 and 150 mm$^2$/s, advantageously between 5 and 120 mm$^2$/s, more advantageously between 7 and 90 mm$^2$/s.

According to a second preferred variant, the hydrocarbon-based oil is chosen from liquid paraffins with a total content of paraffinic compounds of at least 50% by mass relative to the total mass of the liquid paraffin.

According to a preferred embodiment, the pitch has a penetrability at 25° C. ranging from 0 to 20 1/10 mm, it being understood that the penetrability is measured according to the standard EN 1426.

According to a first variant, the pitch has a ring-and-ball softening point (RBSP), measured according to the standard EN 1427, ranging from 115° C. to 175° C.

According to a preferred embodiment of this first variant, the pitch is an oxidized pitch.

According to a second variant, the pitch has a ring-and-ball softening point (RBSP), measured according to the standard EN 1427, ranging from 55° C. to 110° C.

According to a preferred embodiment of this second variant, the pitch is derived from a deasphalting operation by the addition of a $C_3$-$C_4$ aliphatic solvent.

According to a preferred embodiment, the organogelator compound has a molar mass of less than or equal to 2000 g·mol$^{-1}$.

According to a preferred embodiment, the binder comprises from 0.2% to 5% by mass, more preferentially from 0.5% to 3.5% by mass, of organogelator additive relative to the total mass of the binder.

According to a preferred embodiment, the binder is in the form of pellets or blocks.

The invention also relates to a kit comprising at least:
one binder which is solid at room temperature as defined above and detailed below or a solid binder consisting of a hydrocarbon-based oil of petroleum or synthetic origin and mixtures thereof, and
one capsule comprising at least one additive.

The invention also relates to a process for preparing a binder which is solid at room temperature as defined above and detailed below, comprising:
(i) mixing of the oil and the pitch, and heating to a temperature of between 140 and 200° C.,
(ii) addition of the organogelator compound, mixing and heating to a temperature of between 140 and 200° C.,
(iii) optional addition of one or more other additives, mixing and heating to a temperature of between 140 and 200° C.,
(iv) shaping of the composition, for example in the form of pellets or blocks,
(v) cooling to room temperature.

The invention also relates to a process for transporting and/or storing and/or handling a binder which is solid at room temperature and which is in divided form as defined above and detailed below, or a kit comprising such a binder, the binder being transported and/or stored and/or handled in the form of blocks or pellets which are solid at room temperature.

The invention also relates to the use of a binder which is solid at room temperature and which is in divided form, comprising:
at least one oil chosen from a hydrocarbon-based oil of petroleum or synthetic origin and mixtures thereof,
at least one organogelator chemical additive,
for the manufacture of bituminous surfacing mixes comprising aggregates obtained from recycled bituminous mixes.

According to a preferred embodiment, the binder which is solid at room temperature and which is in divided form also comprises at least one pitch, preferably with a penetrability at 25° C. ranging from 0 to 20 V/10 mm, and advantageously chosen from:
a pitch obtained from a deasphalting operation by the addition of a $C_3$-$C_4$ aliphatic solvent and having a ring-and-ball softening point (RBSP) ranging from 55° C. to 110° C.;
a pitch or an oxidized pitch with a ring-and-ball softening point (RBSP) ranging from 115° C. to 175° C.,
it being understood that the penetrability is measured according to the standard EN 1426 and that the RBSP is measured according to the standard EN 1427.

According to a preferred embodiment of the use, the binder which is solid at room temperature and which is in divided form is as defined above or detailed below or in the form of a kit.

DETAILED DESCRIPTION

The expression "consisting essentially of" followed by one or more characteristics means that, besides the components or steps explicitly listed, components or steps which do not significantly modify the properties and characteristics of the invention may be included in the process or the material of the invention.

The expression "between X and Y" includes the limits, unless explicitly mentioned otherwise. This expression thus means that the targeted range includes the values X, Y and all the values ranging from X to Y.

For the purposes of the present invention, the term "binder" means a composition comprising at least one oil and optionally at least one pitch, said composition being usable as a mixture with granulates, in substitution for bitumen-based binders, for the preparation, for example, of bituminous surfacing mixes.

The term "binder which is solid at room temperature" means a binder which has a solid appearance at room temperature under transportation and/or storage and/or handling conditions. More specifically, this means a solid binder which conserves its solid appearance throughout the transportation and/or storage and/or handling at room temperature, i.e. a solid binder which does not undergo creep at a temperature ranging up to 80° C., advantageously from 5° C. to 70° C., preferably from 10° C. to 70° C., more preferentially from 10° C. to 60° C., even more preferentially from 15° C. to 50° C., and at pressure forces derived from the transportation and/or storage and/or handling conditions.

The term "binder which is solid at room temperature and which is in divided form" means a binder which is solid at room temperature and which is packaged in a divided form, i.e. in the form of units that are separate from each other, which are referred to as pellets or blocks.

The binder according to the invention is also equivalently referred to in the present description as "solid binder" or "solid composition".

The binder according to the invention is equivalently referred to in the present description as "binder which is solid under cold conditions and which is in divided form" or "supplemented binder".

The binder according to the invention is also referred to in the present invention as "rejuvenating binder".

The term "penetrability" means herein the measurement known as the "needle penetrability", which is performed using a standardized test NF EN 1426 at 25° C. (P25). This penetrability characteristic is expressed in tenths of a millimeter (dmm or 1/10 mm). The needle penetrability, measured at 25° C., according to the standardized test NF EN 1426, represents the measurement of the penetration into a bitumen sample, after a time of 5 seconds, of a needle whose weight with its support is 100 g. The standard NF EN 1426 replaces the homologated standard NF T 66-004 of December 1986 with effect from Dec. 20, 1999 (decision of the General Director of AFNOR dated Nov. 20, 1999).

The Oil

The oil may be of any type, and is chosen as a function of the subsequent application conditions, notably of the origin of the recycled aggregates. It may be a hydrocarbon-based oil of petroleum origin, a hydrocarbon-based oil of synthetic origin or a mixture thereof.

Preferably, the oil is a hydrocarbon-based oil of petroleum origin. It may be of aromatic or paraffinic type.

According to a first embodiment, the oil is composed of from 90% to 100% by mass of at least one hydrocarbon-based oil of petroleum origin, advantageously from 95% to 100%, better still from 98% to 100%, by mass of at least one hydrocarbon-based oil of petroleum origin. Even more advantageously, the oil is constituted of a hydrocarbon-based oil or a mixture of hydrocarbon-based oils of petroleum origin.

In a first embodiment of the invention, the hydrocarbon-based oil of petroleum origin is chosen from aromatic oils.

More preferentially, the aromatic oils have a content of aromatic compounds of between 30% and 95% by mass, advantageously between 50% and 95% by mass, more advantageously between 60% and 95% by mass relative to the total mass of the aromatic oil (SARA: Saturates/Aromatics/Resins/Asphaltenes method).

More preferentially, the aromatic oils have a content of saturated compounds of between 1% and 20% by mass, advantageously between 3% and 15% by mass, more advantageously between 5% and 10% by mass (SARA: Saturates/Aromatics/Resins/Asphaltenes method).

More preferentially, the aromatic oils have a content of resinous compounds of between 1% and 10% by mass, advantageously between 3% and 5% by mass (SARA: Saturates/Aromatics/Resins/Asphaltenes method).

The contents of saturated, resinous and aromatic compounds mentioned in the present patent application are determined according to the standard ASTM D2140, as mass percentages relative to the mass of the oil.

More preferentially, the aromatic oils have a kinematic viscosity at 100° C. of between 0.1 and 150 mm$^2$/s, advantageously between 5 and 120 mm$^2$/s, more advantageously between 7 and 90 mm$^2$/s (method: ASTM D 445).

More preferentially, the aromatic oils have a Cleveland flash point of greater than or equal to 150° C., advantageously between 150° C. and 600° C., more advantageously between 200° C. and 400° C. (method: EN ISO 2592).

More preferentially, the aromatic oils have an aniline point of between 20° C. and 120° C., advantageously between 40° C. and 120° C. (method: ASTM D611).

More preferentially, the aromatic oils have a mass per unit volume at 15° C. of between 400 kg/m$^3$ and 1500 kg/m$^3$, advantageously between 600 kg/m$^3$ and 1200 kg/m$^3$, more advantageously between 800 kg/m$^3$ and 1000 kg/m$^3$ (method: ASTM D4052).

According to this advantageous embodiment, the aromatic oil comprises aromatic extracts of petroleum residues, obtained by extraction or dearomatization of petroleum fraction distillation residues.

The aromatic extracts are byproducts of the crude oil refining process, obtained notably from the products of vacuum distillation of the atmospheric residues. They result from a single or double extraction of the upgradable raffinate in lubricants, by means of a polar solvent. The various extracts are classified in different categories as a function of the process for obtaining them and are as follows:

DAEs (Distillate Aromatic Extracts),
MESs (Mild Extract Solvates),
TDAEs (Treated Distillate Aromatic Extracts),
RAEs (Residual Aromatic Extracts),
TRAEs (Treated Residual Aromatic Extracts).

For example, the aromatic oils that may be used according to the invention may be chosen from the following products sold by the company Total under the names: Plaxolene 50® (also sold under the brand name Regenis 50®), Plaxolene TD 346® and Plaxolene MS132®.

The respective contents of paraffinic, naphthenic and aromatic compounds depend to a certain extent on the nature of the crude oil that is the source of the aromatic oil and on the refining process used.

For example, Plaxolene 50® or Regenis 50® is an RAE (residual aromatic extract) which has:
- a mass per unit volume at 15° C. of between 980 kg/m$^3$ and 1010 kg/m$^3$ (method: ASTM D4052),
- a flash point (Cleveland) of about 230° C. (method: EN ISO 2592),
- a kinematic viscosity at 100° C. of between 60 and 85 mm$^2$/s (method: ASTM D 445),
- an aniline point of between 53 and 65° C. (method: ASTM D611).

For example, Plaxolene TD346® is a TDAE (treated distillates aromatic extract) which has:
- a mass per unit volume at 15° C. of between 940 kg/m$^3$ and 970 kg/m$^3$ (method: ASTM D4052),
- a flash point (Cleveland) of about 220° C. (method: EN ISO 2592),
- a kinematic viscosity at 100° C. of between 16 and 23 mm$^2$/s (method: ASTM D 445),
- an aniline point of between 64 and 72° C. (method: ASTM D611).

For example, Plaxolene MS132® is an MES (mild extract solvate) which has:
- a mass per unit volume at 15° C. of between 895 kg/m$^3$ and 925 kg/m$^3$ (method: ASTM D4052),
- a flash point (Cleveland) of about 230° C. (method: EN ISO 2592),
- a kinematic viscosity at 100° C. of between 13 and 17 mm$^2$/s (method: ASTM D 445),
- an aniline point of between 85 and 100° C. (method: ASTM D611).

According to a second advantageous embodiment, the oil is a liquid paraffin predominantly comprising paraffinic extracts from petroleum residues. According to this specific embodiment, advantageously, the oil comprises a total content of paraffinic compounds of at least 50% by mass, preferably of at least 60% by mass, for example between 50% and 90%, preferably between 60% and 90%, more preferentially between 50% and 80% and in particular between 55% and 75% or in particular between 60% and 75%.

In a more specific embodiment, the oil also contains a total content of naphthenic compounds which does not exceed 25%, for example between 5% and 25%, and in particular between 10% and 25%.

In a more specific embodiment, the oil also contains a total content of aromatic compounds which does not exceed 25%, for example between 5% and 25%, and in particular between 8% and 18%.

In a particularly preferred embodiment, the oil is a liquid paraffin comprising the respective contents:

(i) a total content of paraffinic compounds of between 50% and 90%;

(ii) a total content of naphthenic compounds of between 5% and 25%; and (iii) a total content of aromatic compounds of between 5% and 25%.

In a more particularly preferred embodiment, the oil is a liquid paraffin comprising the respective contents:

(i) a total content of paraffinic compounds of between 60% and 75%;

(ii) a total content of naphthenic compounds of between 5% and 25%; and (iii) a total content of aromatic compounds of between 5% and 25%.

In a more preferred embodiment, the oil is a liquid paraffin comprising the respective contents:

(i) a total content of paraffinic compounds of between 60% and 75%;

(ii) a total content of naphthenic compounds of between 15% and 25%; and (iii) a total content of aromatic compounds of between 10% and 15%.

In a preferred embodiment of this variant, the liquid paraffins are derived from deasphalting fractions from distillation under reduced pressure (vacuum residue, VR) of crude oil (referred to hereinbelow as "DAO oil"). The principle of deasphalting is based on separation by precipitation of a petroleum residue into two phases: i) a "deasphalted oil" phase, also known as the "oil matrix" or "oil phase" or DAO (DeAsphalted Oil); and ii) an "asphalt" phase.

Oils corresponding to the characteristics below and which may be used according to the invention are obtained via the processes of deasphalting of vacuum residues (VR) derived from the refining of petroleum, for example by deasphalting a C3 to C6 solvent, preferably with propane. Deasphalting processes are well known to those skilled in the art and are described, for example in FR3014111, US 2004/0069685, U.S. Pat. Nos. 4,305,812 and 4,455,216 or in Lee et al., 2014, Fuel Processing Technology 119: 204-210.

In Lee et al., 2014, Fuel Processing Technology 119: 204-210, the residues derived from the vacuum distillation (VR) are separated according to their molecular mass in the presence of C3 to C6 solvent (for example propane). The DAO oil thus obtained is rich in paraffin, has a very low content of asphaltenes, has an evaporation temperature of between 440° C. and 750° C., and an API gravity much higher than that of the vacuum residues.

The API gravity or API density of an oil (American Petroleum Institute gravity) may be obtained from formula (1) below:

$$G_{API} = \frac{141.5}{d} - 131.5$$

with:

$G_{API}$, the API gravity of the oil under consideration (expressed without units), and d, the density at 16° C. (60° F.) of the oil under consideration (expressed without units), taking water as reference.

The respective contents of paraffinic, naphthenic and aromatic compounds depend to a certain extent on the nature of the crude oil which is the source of the DAO oil and on the refining process used. A person skilled in the art knows how to determine the respective contents of paraffinic, naphthenic and aromatic compounds of a DAO oil, for example using the SARA fractionation method also described in Lee et al., 2014, Fuel Processing Technology 119: 204-210 and thus to select the DAO oil that is suitable for the preparation of the gelled oil composition according to the invention.

The contents of paraffinic, naphthenic and aromatic compounds mentioned in the present patent application are determined according to the standard ASTM D2140, as mass percentages relative to the mass of the oil.

In a third embodiment of the invention, the hydrocarbon-based oil of petroleum origin is a mixture of aromatic oils as described above and of liquid paraffins as described above.

According to another embodiment, the binder may also comprise an oil of plant origin.

For example, the oils of plant origin may be chosen from rapeseed, sunflower, soybean, linseed, olive, palm, castor, wood, corn, marrow, grapeseed, jojoba, sesame, walnut, hazelnut, almond, shea, macadamia, cotton, alfalfa, rye, safflower, groundnut, coconut and coconut kernel oils, and mixtures thereof.

The Pitch:

The pitch is used optionally as a mixture with the oil in the binder.

According to the French dictionary, the term "pitch" means a residue from the distillation of petroleum tars, of petroleum, of coal, of wood or of other organic molecules.

The pitch used in the invention is chosen from petroleum distillation residues, also known as "petroleum pitch".

In the description, the terms "pitch", "petroleum pitch" and "deasphalting pitch" will be used independently of each other.

The pitches may be obtained via conventional processes of refinery manufacture. The manufacturing process corresponds to the succession of atmospheric distillation and vacuum distillation. In a first stage, the crude oil is subjected to distillation at atmospheric pressure, which leads to the production of a gaseous phase, of various distillates and of an atmospheric distillate residue. Next, the atmospheric distillation residue is itself subjected to distillation under reduced pressure, referred to as vacuum distillation, which makes it possible to separate a heavy gas oil, various distillate fractions and a vacuum distillation residue. This vacuum distillation residue contains "petroleum pitch" in variable concentration.

It is possible to obtain "petroleum pitch" according to two processes:

1st Process:

The vacuum distillation residue is subjected to a deasphalting operation by addition of a suitable solvent, such as propane, which thus makes it possible to precipitate the pitch and to separate it from the light fractions such as the deasphalted oil.

2nd Process:

The vacuum distillation residue is subjected to a solvent extraction, more precisely with furfural. This heterocyclic aldehyde has the particular feature of selectively dissolving polycyclic aromatic compounds. This process thus makes it possible to remove the aromatic extracts and to recover the "petroleum pitch".

According to one embodiment of the invention, the pitch is in the form of pellets before it is introduced into the heated oil. Such an embodiment facilitates the handling of the components and the implementation of the process.

The mechanical qualities of the pitches are generally assessed by determining a series of mechanical characteristics by means of standardized tests, of which the ones most commonly used are the needle penetrability expressed in 1/10 mm and the softening point determined by the ring-and-ball test, also known as the ring-and-ball softening point (RBSP).

According to one embodiment of the invention, the pitch has a needle penetrability at 25° C. of from 0 to 20 1/10 mm, preferably from 5 to 20 1/10 mm, it being understood that the penetrability is measured according to the standard EN 1426.

According to a first variant, the pitch has a softening point of between 115° C. and 175° C. Among examples of pitches used in the invention are pitches which have, respectively, a softening point of between 115° C. and 125° C., between 135 and 145° C. or between 165 and 175° C.

According to a preferred embodiment of this first variant, the pitch is a blown pitch, also known as an oxidized pitch. For the purposes of the invention, the terms "blown pitch" and "oxidized pitch" will be used independently of each other.

Preferably, the oxidized pitch used according to the invention is obtained by oxidation of a mixture comprising pitch and a diluent, such as a light spirit, also known as a "fluxing agent" subjected to an oxidation operation in a blowing tower in the presence of a catalyst, at a set temperature and at a given pressure.

For example, the oxidized pitches may be manufactured in a blowing unit, by passing a stream of air and/or oxygen through a starting pitch. This operation may be performed in the presence of an oxidation catalyst, for example phosphoric acid. Generally, the oxidation is performed at high temperatures, of the order of 200 to 300° C., for relatively long times typically between 30 minutes and 2 hours, continuously or batchwise. The oxidation time and temperature are adjusted as a function of the properties targeted for the oxidized pitch and as a function of the quality of the starting pitch.

According to a second variant, the pitch has a ring-and-ball softening point (RBSP), measured according to the standard EN 1427, ranging from 55° C. to 110° C.

According to a preferred embodiment of this second variant, the pitch is derived from a deasphalting operation by addition of a $C_3$-$C_4$ aliphatic solvent, preferably obtained directly after a deasphalting operation by addition of a $C_3$-$C_4$ aliphatic solvent.

Preferably, according to this preferred embodiment, the deasphalting solvent is chosen from propane, butane and mixtures thereof.

The addition of a pitch with the mechanical characteristics presented above to an oil makes it possible to obtain a rejuvenating binder that is suitable for any type of aggregates originating from recycled bituminous mixes.

The binder of the invention may be prepared via a process comprising at least the steps of:

heating the oil to a temperature ranging from 140 to 180° C., introducing pitch into the oil, stirring the mixture at a temperature ranging from 140 to 180° C. until a homogeneous mixture is obtained.

It has been found that the pitch mixes perfectly with the oil.

Advantageously, the pitch does not need to be heated before being added to the oil. Although the pitch usually has a melting point above 220° C., it dissolves in the oils at the usual binder preparation temperatures. The process for manufacturing the binder of the invention is easy to perform and does not require that the pitch intended to be added to the oil be transported hot over long distances.

According to one embodiment of the invention, the pitch is used in solid form under cold conditions and in divided form, preferably in the form of pellets, in the process for producing binders. This form facilitates the handling of the pitch for its use in the manufacture of the binder of the invention.

The term "pitch which is solid under cold conditions and in divided form" means a pitch which is solid at room temperature and which is packaged in a divided form, i.e. in the form of units that are separate from each other, for example pellets.

The pitch pellets may have, within the same population of pellets, one or more forms chosen from a cylindrical, spherical or ovoid form. More precisely, the pitch pellets preferably have a cylindrical or spherical form, or alternatively a hemispherical form.

Advantageously, the size of the pitch pellets is such that the longest mean dimension is preferably less than or equal to 50 mm, more preferentially from 2 to 30 mm. For example, the use of a die makes it possible to control the manufacture of pellets of a chosen size. Screening makes it possible to select pellets as a function of their size.

To allow the formation of pitch pellets which do not adhere together and which withstand compression during storage, it may be advantageous to use pitch pellets that are coated over all or part of their surface with an anti-agglomerating compound. The pitch, in the form of pellets optionally covered with an anti-agglomerating compound, is easy to handle after a prolonged period of transportation and/or storage. The anti-agglomerating compound is then found in the composition forming the core of the pellets.

The Organogelator Compound

The binder which is solid at room temperature and which is in divided form according to the invention comprises at least one chemical additive chosen from organogelator compounds.

In particular, the binder which is solid at room temperature and which is in divided form comprises at least one organogelator chemical additive in a suitable amount so that this composition is solid at room temperature and is in divided form.

In one embodiment of the invention, the organogelator chemical additive is an organic compound. Advantageously, the organogelator compound has a molar mass of less than or equal to 2000 g·mol$^{-1}$, preferably a molar mass of less than or equal to 1000 g/mol$^{-1}$.

In this first embodiment, according to a first variant, the organogelator compound is a compound of general formula (I):

Ar1-R—Ar2     (I), in which:

Ar1 and Ar2 represent, independently of each other, a benzene nucleus or a system of fused aromatic nuclei of 6 to 20 carbon atoms, substituted with at least one hydroxyl group and optionally substituted with one or more $C_1$-$C_{20}$ alkyl groups, and R represents an optionally substituted divalent radical, the main chain of which comprises from 6 to 20 carbon atoms and at least one group chosen from amide, ester, hydrazide, urea, carbamate and anhydride functions.

Preferably, Ar1 and/or Ar2 are substituted with at least one alkyl group of 1 to 10 carbon atoms, advantageously in one or more ortho positions relative to the hydroxyl group(s); more preferentially, Ar1 and Ar2 are 3,5-dialkyl-4-hydroxyphenyl groups, advantageously 3,5-di-tert-butyl-4-hydroxyphenyl groups.

Preferably, R is in the para position relative to a hydroxyl group of Ar1 and/or Ar2.

An example of a compound of formula (I) that may be mentioned is 2',3-bis[(3-[3,5-di-tert-butyl-4-hydroxyphenyl]propionyl)]propionohydrazide.

According to a second variant of this embodiment, the organogelator compound is a compound of general formula (II):

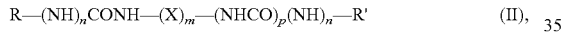

R—(NH)$_n$CONH—(X)$_m$—(NHCO)$_p$(NH)$_n$—R'     (II), in which:

the groups R and R', which may be identical or different, represent a saturated or unsaturated, linear, branched or cyclic hydrocarbon-based chain, comprising from 1 to 22 carbon atoms, optionally substituted with one or more hydroxyl groups or amine groups, and optionally comprising heteroatoms such as N, O, S, $C_5$-$C_{24}$ hydrocarbon-based rings and/or $C_4$-$C_{24}$ hydrocarbon-based heterocycles comprising one or more heteroatoms such as N, O, S, and R' may be H;

the group X represents a saturated or unsaturated, linear, cyclic or branched hydrocarbon-based chain, comprising from 1 to 22 carbon atoms, which is optionally substituted, and optionally comprising heteroatoms such as N, O, S, $C_5$-$C_{24}$ hydrocarbon-based rings and/or $C_4$-$C_{24}$ hydrocarbon-based heterocycles comprising one or more heteroatoms such as N, O, S;

n, m and p are integers having a value of 0 or 1, independently of each other.

According to this variant, when the integer m has a value of 0 and when the integer p has a value of 1, then the groups R—(NH)$_n$CONH and NHCO(NH)$_n$—R' are covalently bonded and together form a hydrazide bond CONH—NHCO. The group R, or the group R', then represents at least one group chosen from: a hydrocarbon-based chain of at least 4 carbon atoms, an aliphatic ring of 3 to 8 atoms, an aliphatic, partially aromatic or fully aromatic fused polycyclic system, each ring comprising 5 or 6 atoms.

Still according to this variant, when the integer m has a value of 1, then the group R, the group R' and/or the group X represent at least one group chosen from: a hydrocarbon-based chain of at least 4 carbon atoms, an aliphatic ring of 3 to 8 atoms, an aliphatic, partially aromatic or fully aromatic fused polycyclic system, each ring comprising 5 or 6 atoms.

Preferably, the group R and/or the group R' represent an aliphatic hydrocarbon-based chain of 4 to 22 carbon atoms chosen notably from $C_4H_9$, $C_5H_{11}$, $C_9H_{19}$, $C_{11}H_{23}$, $C_{12}H_{25}$, $C_{17}H_{35}$, $C_{18}H_{37}$, $C_{21}H_{43}$, $C_{22}H_{45}$ groups.

According to a first preferred embodiment, the group X represents a saturated linear hydrocarbon-based chain comprising from 1 to 22 carbon atoms, advantageously from 1 to 12 carbon atoms, better still from 1 to 10 carbon atoms. Preferably, the group X is chosen from $C_2H_4$, $C_3H_6$ groups.

According to a second preferred embodiment, the group X may also be a cyclohexyl group or a phenyl group, and the radicals R—(NH)$_n$CONH— and —NHCO(NH)$_n$—R' may then be in the ortho, meta or para position. Moreover, the radicals R—(NH)$_n$CONH— and —NHCO(NH)$_n$—R' may be in the cis or trans position relative to each other. Furthermore, when the radical X is cyclic, this ring may be substituted with groups other than the two main groups R—(NH)$_n$CONH— and —NHCO(NH)$_n$—R'.

According to a third preferred embodiment, the group X represents two optionally substituted rings of 6 carbons, connected via a $CH_2$ group, these rings being aliphatic or aromatic. In this case, the group X is, for example:

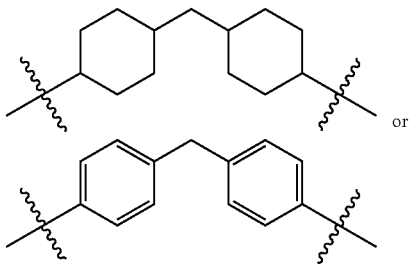

or

Advantageously, according to this variant, the organgelling compound is a compound of general formula (II) chosen from hydrazide derivatives such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$; diamides such as N,N'-ethylenedi(laurylamide) of formula $C_{11}H_{23}$—CONH—$CH_2$—$CH_2$—NHCO—$C_{11}H_{31}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$, N,N'-ethylenedi(stearamide) of formula $C_{17}H_{35}$—CONH—$CH_2$—$CH_2$—NHCO—$C_{17}H_{35}$; and ureide derivatives such as 4,4'-bis(dodecylaminocarbonylamino)-diphenylmethane of formula $C_{12}H_{25}$—NHCONH—$C_6H_4$—$CH_2$—$C_6H_4$—NHCONH—$C_{12}H_{25}$.

Preferably, the compound of general formula (II) is chosen from those which satisfy the condition n=0.

Preferably, the compound of general formula (II) is chosen from those which satisfy the condition: the sum of the numbers of carbon atoms of R, X and R' is greater than or equal to 10, advantageously greater than or equal to 14, preferably greater than or equal to 18.

Preferably, the compound of general formula (II) is chosen from those which satisfy the condition: the number of carbon atoms of at least one from among R and R' is greater than or equal to 10, advantageously greater than or equal to 12, preferably greater than or equal to 14.

Preferably, according to a first variant, the compound of general formula (II) is chosen from those of formula (IIA):

$$R—CONH—(X)_m—NHCO—R' \qquad (IIA)$$

in which R, R', m and X have the same definition as above.

Preferably, in formula (IIA), when m=1, the group X represents a saturated linear hydrocarbon-based chain comprising from 1 to 22 carbon atoms; advantageously, X represents a saturated linear hydrocarbon-based chain comprising from 1 to 12 carbon atoms, better still from 1 to 4 carbon atoms. Preferably, the group X is chosen from $C_2H_4$, $C_3H_6$ groups.

Preferably, the compound of general formula (IIA) is chosen from those which satisfy the condition: the sum of the numbers of carbon atoms of R, X and R' is greater than or equal to 10, advantageously greater than or equal to 14, preferably greater than or equal to 18.

Preferably, the compound of general formula (IIA) is chosen from those which satisfy the condition: the number of carbon atoms of at least one from among R and R' is greater than or equal to 10, advantageously greater than or equal to 12, preferably greater than or equal to 14.

More preferentially, according to this variant, the compound of general formula (IIA) is chosen from hydrazide derivatives such as the compounds $C_5H_{11}$—CONH—NHCO—$C_5H_{11}$, $C_9H_{19}$—CONH—NHCO—$C_9H_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$; diamides such as N,N'-ethylenedi(laurylamide) of formula $C_{11}H_{23}$—CONH—$CH_2$—$CH_2$—NHCO—$C_{11}H_{31}$, N,N'-ethylenedi(myristamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$, N,N'-ethylenedi(stearamide) of formula $C_{17}H_{35}$—CONH—$CH_2$—$CH_2$—NHCO—$C_{17}H_{35}$; monoamides such as laurylamide of formula $C_{11}H_{23}$—$CONH_2$, myristylamide of formula $C_{13}H_{27}$—$CONH_2$, palmitamide of formula $C_{15}H_{31}$—$CONH_2$, stearamide of formula $C_{17}H_{35}$—$CONH_2$.

Even more advantageously, the compound of general formula (IIA) is N,N'-ethylenedi(stearamide) of formula $C_{17}H_{35}$—CONH—$CH_2$—$CH_2$—NHCO—$C_{17}H_{35}$.

Preferably, according to a second variant, the compound of general formula (II) is chosen from those of formula (IIB):

$$R—CONH—R' \qquad (IIB)$$

in which R and R' have the same definition as above.

Advantageously, according to this variant, the sum of the numbers of carbon atoms of R and R' is greater than or equal to 10, advantageously greater than or equal to 14, preferably greater than or equal to 18.

Even more advantageously, according to this variant, the number of carbon atoms of R is greater than or equal to 10, advantageously greater than or equal to 12, preferably greater than or equal to 14, and R' =H.

Advantageously, the compound of general formula (II) is chosen from hydrazide derivatives such as the compounds $C_5H_{11}$—CONH—NHCO—$C_5H_{11}$, $C_9H_{19}$—CONH—NHCO—$CH_{19}$, $C_{11}H_{23}$—CONH—NHCO—$C_{11}H_{23}$, $C_{17}H_{35}$—CONH—NHCO—$C_{17}H_{35}$, or $C_{21}H_{43}$—CONH—NHCO—$C_{21}H_{43}$; diamides such as N,N'-ethylenedi(laurylamide) of formula $C_{11}H_{23}$—CONH—$CH_2$—$CH_2$—NHCO—$C_{11}H_{31}$, N,N'-ethylenedi(myristylamide) of formula $C_{13}H_{27}$—CONH—$CH_2$—$CH_2$—NHCO—$C_{13}H_{27}$, N,N'-ethylenedi(palmitamide) of formula $C_{15}H_{31}$—CONH—$CH_2$—$CH_2$—NHCO—$C_{15}H_{31}$, N,N'-ethylenedi(stearamide) of formula $C_{17}H_{35}$—CONH—$CH_2$—$CH_2$—NHCO—$C_{17}H_{35}$; monoamides such as laurylamide of formula $C_{11}H_{23}$—$CONH_2$, myristylamide of formula $C_{13}H_{27}$—$CONH_2$, palmitamide of formula $C_{15}H_{31}$—$CONH_2$, stearamide of formula $C_{17}H_{35}$—$CONH_2$.

Even more advantageously, the compound of general formula (II) is N,N'-ethylenedi(stearamide) of formula $C_{17}H_{35}$—CONH—$CH_2$—$CH_2$—NHCO—$C_{17}H_{35}$.

Preferably, when the chemical additive is chosen from the organic compounds of formula (II), it is used in combination with at least one other chemical additive chosen from the organic compounds of formulae (I), (III), (V), (VI) and (VII) and/or the products of reaction of at least one $C_3$-$C_{12}$ polyol and of at least one $C_2$-$C_{12}$ aldehyde, notably those comprising a group of formula (IV).

According to a third variant, the organogelator compound is a compound of formula (III):

$$(R—NHCO)_x—Z—(NHCO—R')_y \qquad (III),$$

in which:

R and R', which may be identical or different, represent a saturated or unsaturated, linear, branched or cyclic hydrocarbon-based chain comprising from 1 to 22 carbon atoms, which is optionally substituted, and optionally comprising heteroatoms such as N, O, S, $C_5$-$C_{24}$ hydrocarbon-based rings and/or $C_4$-$C_{24}$ hydrocarbon-based heterocycles comprising one or more heteroatoms such as N, O, S, Z represents a trifunctionalized group chosen from the following groups:

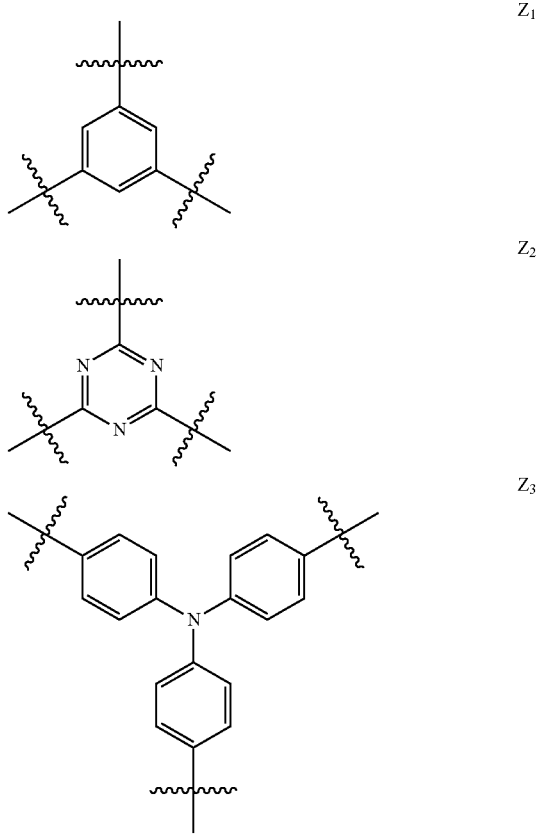

x and y are different integers having a value ranging from 0 to 3 and such that x+y=3.

Preferably, when x is equal to 0 and Z represents $Z_2$, the compound of formula (III) is N2,N4,N6-tridecylmelamine having the following formula with R' representing the $C_9H_{19}$ group:

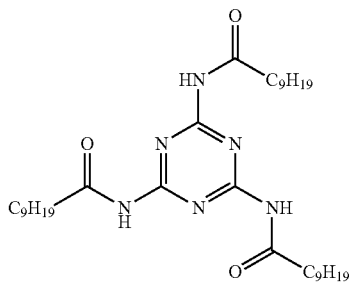

Other preferred compounds corresponding to formula (III) are such that x is equal to 0, Z represents $Z_2$ and R' represents a saturated linear hydrocarbon-based chain of from 1 to 22 carbon atoms, preferably from 2 to 18 carbon atoms, preferably from 5 to 12 carbon atoms.

Other preferred compounds corresponding to formula (III) are such that: y is equal to 0 and Z represents $Z_1$; the compounds then have the formula:

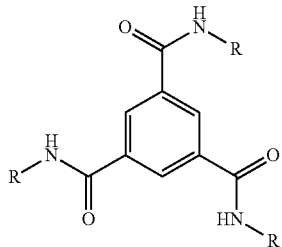

with R chosen from the following groups, taken alone or as mixtures:

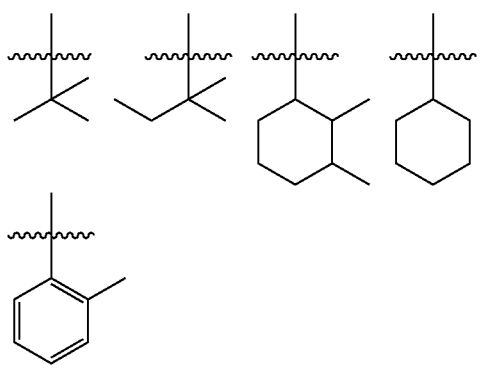

Other preferred compounds corresponding to formula (III) are such that: y is equal to 0, Z represents $Z_1$ and R represents a saturated linear hydrocarbon-based chain of from 1 to 22 carbon atoms, preferably from 8 to 12 carbon atoms.

According to a fourth variant, the organogelator compound is a product of reaction of at least one $C_3$-$C_{12}$ polyol and of at least one $C_2$-$C_{12}$ aldehyde. Among the polyols that may be used, mention may be made of sorbitol, xylitol, mannitol and/or ribitol. Preferably, the polyol is sorbitol.

Advantageously, according to this variant, the organogelator compound is a compound which comprises at least one function of general formula (IV):

with:
x is an integer,
R is chosen from a $C_1$-$C_{12}$ alkyl, $C_2$-$C_{12}$ alkenyl, $C_6$-$C_{12}$ aryl or $C_7$-$C_{12}$ aralkyl radical, optionally substituted with one or more halogen atoms, one or more $C_1$-$C_6$ alkoxy groups.

According to this variant, the organogelator compound is advantageously a sorbitol derivative. The term "sorbitol derivative" means any reaction product obtained from sorbitol. In particular, any reaction product obtained by reacting an aldehyde with D-sorbitol. This condensation reaction produces sorbitol acetals, which are sorbitol derivatives. 1,3:2,4-Di-O-benzylidene-D-sorbitol is obtained by reacting 1 mol of D-sorbitol and 2 mol of benzaldehyde and has the formula:

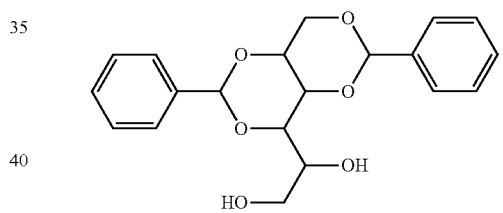

The sorbitol derivatives may thus all be aldehyde condensation products, notably products of condensation of aromatic aldehydes with sorbitol. Sorbitol derivatives having the general formula below will then be obtained:

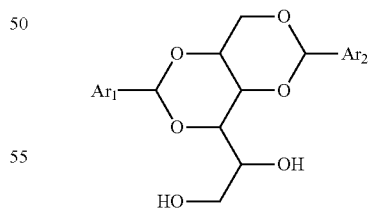

in which $Ar_1$ and $Ar_2$ are optionally substituted aromatic nuclei.

Among the sorbitol derivatives, other than 1,3:2,4-di-O-benzylidene-D-sorbitol, examples of derivatives that may be present include 1,3:2,4:5,6-tri-O-benzylidene-D-sorbitol, 2,4-mono-O-benzylidene-D-sorbitol, 1,3:2,4-bis(p-methylbenzylidene) sorbitol, 1,3:2,4-bis(3,4-dimethylbenzylidene) sorbitol, 1,3:2,4-bis(p-ethylbenzylidene) sorbitol, 1,3:2,4-bis(p-propylbenzylidene) sorbitol, 1,3:2,4-bis(p-butylbenzylidene) sorbitol, 1,3:2,4-bis(p-ethoxylbenzylidene) sorbitol, 1,3:2,4-bis(p-chlorobenzylidene) sorbitol, 1,3:2,4-bis(p-bromobenzylidene) sorbitol, 1,3:2,4-di-O-methylbenzylidene-D-sorbitol, 1,3:2,4-di-O-dimethylbenzylidene-D-sorbitol, 1,3:2,4-di-O-(4-methylbenzylidene)-D-sorbitol, 1,3:2,4-di-O-(4,3-dimethylbenzylidene)-D-sorbitol. Preferably, according to this variant, the organogelator compound is 1,3:2,4-di-O-benzyl idene-D-sorbitol.

According to a fifth variant, the organogelator compound is a compound of general formula (V):

in which R" represents a linear or branched, saturated or unsaturated chain comprising from 4 to 68 carbon atoms, preferably from 4 to 54 carbon atoms, more preferentially from 4 to 36 carbon atoms and z is an integer ranging from 2 to 4.

Preferably, the group R" is a linear saturated chain of formula $C_wH_{2w}$ with w being an integer ranging from 4 to 22, preferably from 4 to 12.

According to this variant of the invention, the organogelator compounds corresponding to formula (V) may be diacids (z=2), triacids (z=3) or tetracids (z=4). The organogelator agents that are preferred according to this variant are diacids with z=2.

Preferably, according to this variant, the diacids (V) have the general formula $HOOC-C_wH_{2w}-COOH$ with w being an integer ranging from 4 to 22, preferably from 4 to 12.

Advantageously, according to this variant, the organogelator compound is a diacid chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12. More advantageously, the organogelator compound is sebacic acid or 1,10-decanedioic acid with w=8.

The diacids may also be diacid dimers of unsaturated fatty acid(s), i.e. dimers formed from at least one unsaturated fatty acid, for example from a single unsaturated fatty acid or from two different unsaturated fatty acids. Diacid dimers of unsaturated fatty acid(s) are conventionally obtained by intermolecular dimerization reaction of at least one unsaturated fatty acid (for example Diels-Alder reaction).

Preferably, only one type of unsaturated fatty acid is dimerized. They are derived in particular from the dimerization of an unsaturated fatty acid which is notably of $C_8$ to $C_{34}$, notably $C_{12}$ to $C_{22}$, in particular $C_{16}$ to $C_{20}$ and more particularly $C_{18}$. A preferred fatty acid dimer is obtained by dimerization of linoleic acid, said dimer then possibly being partially or totally hydrogenated.

Another preferred fatty acid dimer has the formula $HOOC-(CH_2)_7-CH=CH-(CH_2)_7-COOH$. Another preferred fatty acid dimer is obtained by dimerization of methyl linoleate. Similarly, fatty acid triacids and fatty acid tetracids may be found, which are obtained, respectively, by trimerization and tetramerization of at least one fatty acid.

According to a sixth variant, the organogelator compound is a compound of general formula (VI):

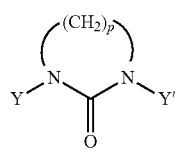

in which:
the groups Y and Y' represent, independently of each other, an atom or group chosen from: H, $-(CH_2)_q-CH_3$, $-(CH_2)_q-NH_2$, $-(CH_2)_q-OH$, $-(CH_2)_q-COOH$ or

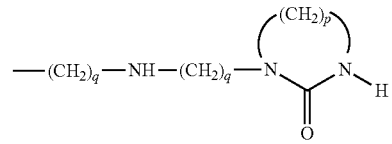

with q being an integer ranging from 2 to 18, preferably from 2 to 10, preferably from 2 to 4 and p being an integer greater than or equal to 2, preferably having a value of 2 or 3.

Among the preferred organogelator compounds corresponding to formula (VI), mention may be made of the following compounds:

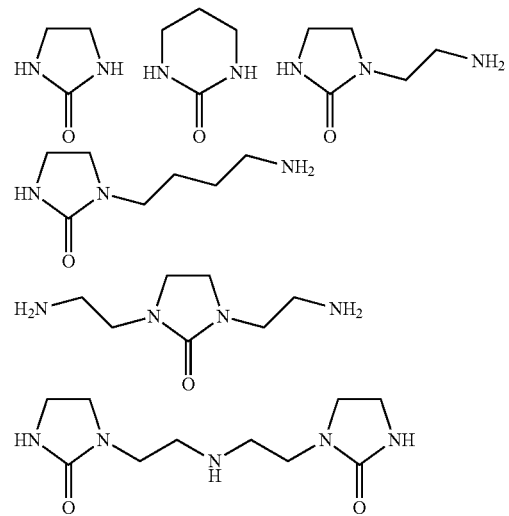

Preferably, according to this variant, the organogelator compound of general formula (VI) is:

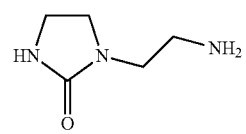

According to a seventh variant of this embodiment, the organogelator compound is a compound of general formula (VII):

in which R and R', which may be identical or different, represent a saturated or unsaturated, linear, branched or cyclic hydrocarbon-based chain comprising from 1 to 22 carbon atoms, preferably from 8 to 12 carbon atoms, which is optionally substituted, and optionally comprising heteroatoms such as N, O, S, $C_5$-$C_{24}$ hydrocarbon-based rings and/or $C_4$-$C_{24}$ hydrocarbon-based heterocycles comprising one or more heteroatoms such as N, O, S.

It would not constitute a departure from the scope of the invention to combine several different chemical additives such as different organogelator compounds of formulae (I), (II), (III), (V), (VI) and (VII), the products of reaction of at least one $C_3$-$C_{12}$ polyol and of at least one $C_2$-$C_{12}$ aldehyde, notably those comprising a group of formula (IV), in the binder.

Advantageously, the binder comprises at least one organogelator additive chosen from the compounds of formula (I), the compounds of formula (II) and the compounds of formula (V).

More advantageously, the binder comprises at least one organogelator additive chosen from the compounds of formula (I) or the compounds of formula (II).

Preferably, the binder comprises an organogelator additive in which the additive is 2',3-bis[(3-[3,5-di-tert-butyl-4-hydroxyphenyl]propionyl)]propionohydrazide.

According to an advantageous embodiment, the binder according to the invention comprises at least two organogelator compounds.

According to a first variant of this embodiment, the binder according to the invention comprises at least one first organogelator compound of formula (V) and at least one second organogelator compound chosen from: the organogelator compounds of formula (I); the organogelator compounds of formula (II); the organogelator compounds of formula (III); the organogelator compounds of formula (V); the organogelator compounds of formula (VI); the organogelator compounds of formula (VII) and the products of reaction of at least one $C_3$-$C_{12}$ polyol and of at least one $C_2$-$C_{12}$ aldehyde, especially those comprising a group of formula (IV), the second organogelator compound being different from the first organogelator compound.

Preferably, and according to this first variant, the binder according to the invention comprises at least one first organogelator compound of formula (V) and at least one second organogelator compound chosen from: the organogelator compounds of formula (I) and the organogelator compounds of formula (II).

When the second organogelator compound is chosen from the organogelator compounds of formula (II), it is preferably chosen from the organogelator compounds of formula (IIA).

Preferably, and still according to this first variant, the first organogelator compound of formula (V) is chosen from diacids (z=2), triacids (z=3) and tetracids (z=4), preferably from diacids (z=2).

More preferably, and still according to this first variant, the first organogelator compound of formula (V) is chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

Advantageously, and according to this first variant, the first organogelator compound of formula (V) is sebacic acid or 1,10-decanedioic acid with w=8.

According to a second variant of this embodiment, the binder according to the invention comprises at least one first organogelator compound of formula (II) and at least one second organogelator compound chosen from: the organogelator compounds of formula (I); the organogelator compounds of formula (II); the organogelator compounds of formula (III); the organogelator compounds of formula (V); the organogelator compounds of formula (VI); the organogelator compounds of formula (VII) and the products of reaction of at least one $C_3$-$C_{12}$ polyol and of at least one $C_2$-$C_{12}$ aldehyde, notably those comprising a group of formula (IV), the second organogelator compound being different from the first organogelator compound.

Preferably, and according to this second variant, the first organogelator compound of formula (II) is chosen from the organogelator compounds of formula (IIA).

More preferentially, and according to this second variant, the binder according to the invention comprises at least one first organogelator compound of formula (IIA) and at least one second organogelator compound chosen from: the organogelator compounds of formula (I); the organogelator compounds of formula (IIB); the organogelator compounds of formula (III); the organogelator compounds of formula (V); the organogelator compounds of formula (VI); the organogelator compounds of formula (VII) and the products of reaction of at least one $C_3$-$C_{12}$ polyol and of at least one $C_2$-$C_{12}$ aldehyde, notably those comprising a group of formula (IV), the second organogelator compound being different from the first organogelator compound.

Even more preferentially, and according to this second variant, the binder according to the invention comprises at least one first organogelator compound of formula (IIA) and at least one second organogelator compound chosen from: the organogelator compounds of formula (I) and the organogelator compounds of formula (V).

Preferably, and according to this second variant, the first organogelator compound of formula (II) is N,N'-ethylenedi(stearamide).

When the second organogelator compound is chosen from the organogelator compounds of formula (V), it is preferably chosen from adipic acid or 1,6-hexanedioic acid with w=4, pimelic acid or 1,7-heptanedioic acid with w=5, suberic acid or 1,8-octanedioic acid with w=6, azelaic acid or 1,9-nonanedioic acid with w=7, sebacic acid or 1,10-decanedioic acid with w=8, undecanedioic acid with w=9, 1,2-dodecanedioic acid with w=10 or tetradecanedioic acid with w=12.

According to a third preferred variant of this embodiment, the binder according to the invention comprises at least sebaic acid or 1,10-decanedioic acid and at least N,N'-ethylenedi(stearamide).

According to a fourth variant of this embodiment, the binder according to the invention comprises at least one first organogelator compound of formula (I) and at least one second organogelator compound chosen from: the organogelator compounds of formula (I); the organogelator compounds of formula (II); the organogelator compounds of formula (III); the organogelator compounds of formula (V); the organogelator compounds of formula (VI); the organogelator compounds of formula (VII) and the products of reaction of at least one $C_3$-$C_{12}$ polyol and of at least one $C_2$-$C_{12}$ aldehyde, notably those comprising a group of formula (IV), the second organogelator compound being different from the first organogelator compound.

Preferably, and according to this fourth variant, the second organogelator compound is chosen from the organogelator compounds of formula (II) and the organogelator compounds of formula (V).

Preferably, and according to this fourth variant, when the second organogelator compound is chosen from the organogelator compounds of formula (II), it is chosen from the organogelator compounds of formula (IIA).

More preferentially, and according to this fourth variant, the second organogelator compound of formula (II) is N,N'-ethylenedi(stearamide).

Preferably, and still according to this fourth variant, when the second organogelator compound is chosen from the organogelator compounds of formula (V), it is chosen from diacids (z=2), triacids (z=3) and tetracids (z=4), preferably from diacids (z=2).

Even more preferentially, and still according to this fourth variant, the second organogelator compound of formula (V) is chosen from adipic acid or 1,6-hexanedioic acid with w=4, pimelic acid or 1,7-hexanedioic acid with w=5, suberic acid or 1,8-octanedioic acid with w=6, azelaic acid or 1,9-nonanedioic acid with w=7, sebacic acid or 1,10-decandedioic acid with w=8, undecanedioic acid with w=9, 1,2-dodecanedioic acid with w=10 or tetradecanedioic acid with w=12.

Advantageously, and still according to this fourth variant, the second organogelator compound of formula (V) is sebacic acid or 1,10-decanedioic acid.

Preferably, and according to this fourth variant, the first organogelator compound of formula (I) is 2',3-bis[(3-[3,5-di-tert-butyl-4-hydroxyphenyl]propionyl)]-propionohydrazide.

Preferably, and according to this embodiment, the mass ratio of the first organogelator compound relative to the second organogelator compound is from 1:99 to 99:1, preferably from 1:9 to 9:1, even more preferentially from 1:5 to 5:1.

Advantageously, the binder comprises from 0.1% to 10% by mass, preferably from 0.2% to 5% by mass, more preferentially from 0.5% to 3.5% by mass of organogelator compound relative to the total mass of the binder.

Binder which is Solid at Room Temperature and in Divided Form

The binder is solid at room temperature and in divided form. It comprises the oil, optionally the pitch and the organogelator additive(s) and, where appropriate, other additives.

According to a first embodiment, the binder does not comprise pitch:

Advantageously, according to this embodiment, the binder comprises, or is essentially composed of:
  80% to 99.9% by mass of at least one oil chosen from: hydrocarbon-based oils of petroleum or synthetic origin,
  0.1% to 10% by mass of at least one organogelator chemical additive,
  0% to 10% by mass of one or more other additives, relative to the total mass of the binder.

Preferably, the binder comprises, or is composed essentially of:
  85% to 99.8% by mass of at least one oil chosen from: hydrocarbon-based oils of petroleum or synthetic origin,
  0.2% to 5% by mass of at least one organogelator chemical additive,
  0% to 10% by mass of one or more other additives, relative to the total mass of the binder.

More preferentially, the binder comprises, or is composed essentially of:
  86.5% to 99.5% by mass of at least one oil chosen from: hydrocarbon-based oils of petroleum or synthetic origin,
  0.5% to 3.5% by mass of at least one organogelator chemical additive,
  0% to 10% by mass of one or more other additives relative to the total mass of the binder.

According to a preferred variant, the organogelator compound is chosen from those corresponding to formula (I), notably 2',3-bis[(3-[3,5-di-tert-butyl-4-hydroxyphenyl]propionyl)]propionohydrazide.

Advantageously, the binder comprises, or is essentially composed of:
  85% to 99.9% by mass of at least one hydrocarbon-based oil of petroleum origin,
  0.1% to 5% by mass of at least one organogelator chemical additive of formula (I), advantageously 2',3-bis[(3-[3,5-di-tert-butyl-4-hydroxyphenyl]propionyl)]-propionohydrazide,
  0% to 10% by mass of one or more other additives, relative to the total mass of the binder.

Preferably, the binder comprises, or is essentially composed of:
  86.5% to 99.8% by mass of at least one hydrocarbon-based oil of petroleum origin,
  0.2% to 3.5% by mass of at least one organogelator chemical additive of formula (I), advantageously 2',3-bis[(3-[3,5-di-tert-butyl-4-hydroxyphenyl]propionyl)]-propionohydrazide,
  0% to 10% by mass of one or more other additives, relative to the total mass of the binder.

According to a second embodiment, the composition comprises pitch:

Advantageously, according to this embodiment, the binder comprises, or is essentially composed of:
  90% to 10% by mass of at least one oil chosen from: hydrocarbon-based oils of petroleum or synthetic origin,
  10% to 90% by mass of at least one pitch,
  0.1% to 10% by mass of at least one organogelator chemical additive,
  0% to 10% by mass of one or more other additives, relative to the total mass of the binder.

Preferably, the binder comprises, or is essentially composed of:
  10% to 70% by mass of at least one oil chosen from: hydrocarbon-based oils of petroleum or synthetic origin,
  90% to 30% by mass of at least one pitch,
  0.2% to 5% by mass of at least one organogelator chemical additive,
  0% to 10% by mass of one or more other additives, relative to the total mass of the binder.

More preferentially, the binder comprises, or is essentially composed of:
  15% to 50% by mass of at least one oil chosen from: hydrocarbon-based oils of petroleum or synthetic origin,
  50% to 85% by mass of at least one pitch,
  0.5% to 3.5% by mass of at least one organogelator chemical additive,
  0% to 10% by mass of one or more other additives, relative to the total mass of the binder.

According to a preferred variant, the organogelator compound is chosen from those corresponding to formula (I), notably 2',3-bis[(3-[3,5-di-tert-butyl-4-hydroxyphenyl]propionyl)]propionohydrazide.

Advantageously according to this variant, the binder comprises, or is essentially composed of:
  10% to 70% by mass of at least one hydrocarbon-based oil of petroleum origin,
  30% to 90% by mass of at least one pitch, 0.1% to 5% by mass of at least one organogelator chemical additive of formula (I), advantageously 2',3-bis[(3-[3,5-di-tert-butyl-4-hydroxyphenyl]propionyl)]-propionohydrazide, 0% to 10% by mass of one or more other additives, relative to the total mass of the binder.

Preferably, the binder comprises, or is essentially composed of:

15% to 50% by mass of at least one hydrocarbon-based oil of petroleum origin,

50% to 85% by mass of at least one pitch, 0.2% to 3.5% by mass of at least one organogelator chemical additive of formula (I), advantageously 2',3-bis[(3-[3,5-di-tert-butyl-4-hydroxyphenyl]propionyl)]-propionohydrazide, 0% to 10% by mass of one or more other additives, relative to the total mass of the binder.

Other Additives

According to one variant of the invention, it may be envisaged to incorporate into the binder any kind of additive usually used for the formulation, as a function of the intended application, provided that these additives do not impede the solidification of the binder composition.

The amount of additive in the binder is calculated as a function of the amount of oil and of pitch that will be used for the intended application and of the expected amount of additive in this application. Usually, the additives are incorporated in amounts ranging from 0.1% to 10% by mass relative to the total mass of the binder.

Process for Preparing the Solid Binder

The binders that are solid at room temperature according to the invention may be prepared, for example, according to the following process comprising the steps of:

(i) mixing the oil, for example the DAO or RAE oil, and heating to a temperature of between 140-200° C., for example for 10 minutes to 30 minutes, (ii) optionally, introducing pitch into the oil, and stirring the mixture at a temperature ranging from 140 to 180° C. until a homogeneous mixture is obtained, (iii) adding the organogelator compound, mixing and heating at a temperature of between 140-200° C., for example for 30 minutes to 2 hours, (iv) optionally adding one or more other additives, mixing and heating at a temperature of between 140-200° C., for example, for 5 minutes to 20 minutes, (v) shaping the binder, for example in the form of pellets or blocks, (vi) cooling to room temperature.

The order of steps (i) to (iv) may be modified.

Pellets of Binder that is Solid at Room Temperature

For the purposes of the invention, the term "binder pellets" may also be defined as a binder which is solid at room temperature, conditioned in a divided form, i.e. in the form of small units referred to as balls, pellets or particles.

The binder pellets according to the invention are obtained by shaping a binder as described above according to any known process, for example according to the manufacturing process described in U.S. Pat. No. 3,026,568, WO 2009/153324 or WO 2012/168380. According to a particular embodiment, the shaping of the pellets may be performed by draining, in particular using a drum.

Other techniques may be used in the process for manufacturing the pellets of binder that is solid at room temperature according to the invention, in particular molding, extrusion, etc.

Preferably, the binder pellets according to the invention may have, within the same population of pellets, one or more shapes chosen from a cylindrical, spherical or ovoid form. The size of the binder pellets according to the invention is such that the longest mean dimension is preferably less than or equal to 50 mm, more preferentially from 3 to 30 mm, even more preferentially between 5 and 20 mm. The size and form of the pellets of binder which is solid at room temperature may vary according to the manufacturing process used. For example, the use of a die makes it possible to control the manufacture of pellets of a chosen size. Screening makes it possible to select pellets as a function of their size.

The binder pellets are preferably transported and stored in bulk in 1 kg to 30 kg or 500 kg to 1000 kg bags commonly known as big bags, said bags preferably being made of a hot-melt material, or in 5 kg to 30 kg cartons or in 100 kg to 200 kg drums.

According to one embodiment of the invention, the binder pellets according to the invention are covered on at least part of their surface with an antiagglomerating agent, preferably on all of their surface.

Block of Binder which is Solid at Room Temperature

According to one embodiment of the invention, the binder which is solid at room temperature and which is in divided form is in block form. For the purposes of the invention, the binder in block form is also referred to as a "binder block".

The term "block of binder which is solid at room temperature" means a block of binder according to the invention which has a mass of between 1 kg and 1000 kg, preferably between 1 kg and 200 kg, more preferentially between 1 kg and 50 kg, even more preferentially between 5 kg and 25 kg, even more preferentially between 10 kg and 30 kg, said block advantageously being parallelepipedal, preferably being a slab.

The binder block according to the invention preferably has a volume of between 1000 cm$^3$ and 50 000 cm$^3$, preferably between 5000 cm$^3$ and 25 000 cm$^3$, more preferentially between 10 000 cm$^3$ and 30 000 cm$^3$, even more preferentially between 14 000 cm$^3$ and 25 000 cm$^3$.

When the binder block according to the invention is handled manually by a person, the mass of the oil block may range from 1 to 20 kg and preferably from 2 to 50 kg in the case of handling by two persons. When the handling is performed with mechanical equipment, the mass of the binder block according to the invention may range from 50 to 1000 kg.

The binder block according to the invention is manufactured from the binder as described above according to any process known industrially, for example by extrusion, by molding, or via the manufacturing process described in US 2011/0290695.

The binder block according to the invention is advantageously wrapped in a hot-melt film according to any known process, preferably with a polypropylene or polyethylene film or a mixture of polyethylene and polypropylene. The binder according to the invention packaged as a block wrapped in a hot-melt film has the advantage of being ready to use, i.e. it may be heated directly in the melting basin without prior unwrapping, for example for the manufacture of novel bituminous surfacing mixes obtained from recycled bituminous mixes aggregates. The hot-melt material which melts with the binder according to the invention does not affect the properties of said binder.

The binder block according to the invention may also be covered with antiagglomerating compound as defined below.

In this variant, the preferences, the advantages and the various embodiments described for the antiagglomerating compounds also apply.

The binder block according to the invention may also be packaged in a carton according to any known process.

In particular, the binder block according to the invention is packaged in a carton by hot-casting the binder according to the invention in a carton in which the wall of the inner face is silicone-treated, and then cooled, the dimensions of the carton being adapted to the mass and/or volume of the desired binder block.

When the binder block according to the invention is wrapped in a hot-melt film or is packaged in a carton, the Applicant has demonstrated that the deterioration of said hot-melt film or of said carton during the transportation and/or storage and/or handling at room temperature of said binder block according to the invention did not lead to any creeping of the binder. Consequently, the binder blocks according to the invention maintain their initial form and do not stick together during their transportation and/or storage and/or handling at room temperature, despite the fact that the hot-melt film or the carton is damaged. The absence of creep of the binder according to the invention in block form during its transportation and/or storage and/or handling at room temperature is due to the presence of the organogelator additive(s) in the binder.

The Antiagglomerating Compound:

Optionally, as presented above, the binder according to the invention in divided solid form at room temperature, for instance in the form of pellets or blocks of binder which is solid at room temperature, may be partially coated with one or more antiagglomerating compounds.

The antiagglomerating compound is of mineral or organic origin. The term "antiagglomerating agent" or "antiagglomerating compound" means any compound which limits, reduces, inhibits or retards the agglomeration and/or adhesion of the pellets or blocks with each other during their transportation and/or storage and/or handling at ambient temperature and which, in the case of pellets, also ensures their fluidity during their handling.

More preferentially, the antiagglomerating compound is chosen from: talc; fines, also known as "fillers", generally with a diameter of less than 125 µm, such as siliceous fines, with the exception of calcareous fines; ultrafines; sand such as Fontainebleau sand; cement, carbon; wood residues such as lignin, lignosulfonate, conifer needle powders, conifer cone powders, notably of pine; rice hull ash; glass powder; clays such as kaolin, bentonite, vermiculite, alumina such as alumina hydrates; silica; silica derivatives such as silicates, silicon hydroxides and other silicon oxides; fumed silica; plastic powder; lime; plaster, rubber crumb; powder of polymers, such as styrene-butadiene (SB) copolymers, styrene-butadiene-styrene (SBS) copolymers and mixtures of these materials.

Advantageously, the antiagglomerating compound is chosen from: fines, generally with a diameter of less than 125 µm; wood residues such as lignin, conifer needle powders and conifer cone powders; fumed silica; mixtures thereof.

Preferably, the antiagglomerating compound is chosen from fumed silica.

For the purposes of the invention, the compounds "fumed silica" and "pyrogenic silica" have the same chemical definition and are registered under the same CAS number 112945-52-5. Consequently, for the purposes of the invention, these compounds may be used equivalently with respect to each other.

The term "pyrogenic silica" means either a pyrogenic silica or a pyrogenic silica derivative.

The term "pyrogenic silica" means a compound obtained by vapor-phase hydrolysis of chlorosilanes such as silicon tetrachloride, in an oxygen-hydrogen flame. Such processes are generally referred to as pyrogenic processes, the overall reaction of which is: $SiCl_4 + H_2 + O_2 \rightarrow SiO_2 + 4\ HCl$.

Pyrogenic silicas are distinguished from other silicon dioxides in that they have an amorphous structure. These high-purity silicas (>99.8% of silica) have little hydrophilic nature (no microporosity).

Preferably, the pyrogenic silica compound is pyrogenic silica.

According to one embodiment of the invention, the pyrogenic silica compound has a specific surface area of between 25 and 420 $m^2/g$, preferentially between 90 and 330 $m^2/g$, more preferentially between 120 and 280 $m^2/g$.

The specific surface area of the pyrogenic silica defined in $m^2/g$, commonly referred to as the surface area or SA is measured according to the method of S. Brunauer, P H Emmet and I. Teller, J. Am. Chemical Society, 60: 309 (1938) (BET).

According to one embodiment of the invention, the pyrogenic silica compound has a mean particle size of between 5 and 50 nm.

According to one embodiment of the invention, the pyrogenic silica compound has a pH of between 3 and 10 when it is in aqueous phase.

According to one embodiment of the invention, the pyrogenic silica compound has a carbon content of between 0.1% and 10% by weight relative to the total weight of the pyrogenic silica compound.

According to one embodiment of the invention, the pyrogenic silica compound is chosen from a hydrophilic pyrogenic silica compound, a hydrophobic pyrogenic silica compound and mixtures thereof.

Preferably, the pyrogenic silica compound is a hydrophilic pyrogenic silica compound.

The term "hydrophilic" refers to a compound which is miscible with water in all proportions.

The pyrogenic silica compound, or pyrogenic silica derivative, used for the purposes of the invention may be chemically modified.

Various types of pyrogenic silica compounds are described in the following patent applications and may be used in the present invention:

silanized pyrogenic silicas, as described in WO 2004/020532, or in WO 2007/128636, hydrophilic pyrogenic silicas, as described in WO 2009/071467, WO 2011/000133 filed in the name of Degussa AG or Degussa GmbH, fumed silicas rendered hydrophobic by a treatment with polysiloxanes as described in WO 2008/141932, or by silanization as described in WO 2008/141930, silicas doped with potassium oxide as described in WO 2008/043635, WO 2008/022836, silicas in the form of aggregates of primary particles as described in WO 2009/015969 filed in the name of Evonik Degussa GmbH or in WO 2010/028261 filed in the name of Cabot Corporation.

The pyrogenic silica compound may be used alone or in the form of a mixture in a coating composition.

Whether it is used alone or as a mixture in a composition, the pyrogenic silica compound may be used in the process according to the invention in the form of a powder or as a dispersion in a solvent which evaporates off after application.

Preferably, when the coating composition comprises at least one pyrogenic silica compound and at least one solvent, the coating composition comprises from 5% to 70% by weight of pyrogenic silica compound relative to the total weight of the coating composition, more preferentially from 20% to 40% by weight.

Preferably, the solvent is an organic solvent or water. The term "organic solvent" means any solvent that is immiscible with a bitumen, such as an alcohol, for example ethanol.

The fumed silicas used in the invention are commercially available and may be sold, for example, by Evonik Degussa under the brand name Aerosil®, for instance Aerosil®200, by Cabot Corporation under the brand names Cab-O-Sil® and Cab-O-Sperse® or alternatively by Wacker Chemie AG under the brand name HDK®.

Preferably, the mass of the antiagglomerating agent covering at least part of the surface of the binder pellets or blocks is between 0.2% and 10% by mass, preferably between 0.5% and 8% by mass, more preferentially between 0.5% and 5% by mass relative to the total mass of binder according to the invention in said pellets or said blocks or said balls.

The antiagglomerating layer covering the binder pellets or blocks according to the invention is preferably continuous so that at least 90% of the surface of the binder pellet or block according to the invention is covered with at least one antiagglomerating agent, preferably at least 95%, more preferentially at least 99%. The antiagglomerating layer must be sufficiently thick so that it is continuous.

The pellets or blocks of binder which is solid at room temperature are covered with the antiagglomerating agent according to any known process, for example according to the process described in U.S. Pat. No. 2,026,568.

Kit of Binder which is Solid Under Cold Conditions and in Divided Form

Another subject of the invention relates to a kit comprising at least:
one binder which is solid under cold conditions and in divided form as defined above,
one capsule comprising at least one additive as defined above.

According to one embodiment of the invention, the binder which is solid under cold conditions and in divided form is in block form.

According to one embodiment of the invention, the binder in block form comprises, on one of its faces, a cavity for housing all or part of the capsule.

According to one embodiment of the invention, the capsule is totally or partly housed in the cavity in a removable manner.

According to this embodiment, the capsule may be a capsule with a soft envelope, notably a sachet, or a capsule with a hard envelope.

Preferably, the capsule is made of hot-melt plastic film, notably of polyethylene, or of silicone.

Another subject of the invention relates to the use of the kit as defined above in the process for preparing a binder that is ready for application according to the invention.

According to one embodiment of the invention, the binder in block form and the capsule forming the kit as defined above are used in the process for preparing a binder simultaneously or consecutively.

In one variant, when the binder in block form and the capsule forming the kit as defined above are used consecutively in the process for preparing a binder, said binder in block form is heated beforehand, and the capsule is then added. In this variant, before heating the binder block, the capsule is dislodged from the cavity present on one of the faces of the block.

In another variant, the binder in block form and the capsule forming the kit as defined above are used simultaneously in the process for preparing a binder.

Process for Transporting and/or Storing and/or Handling the Binder which is Solid at Ambient Temperature and in Divided Form Another subject of the invention also relates to a process for transporting and/or storing and/or handling binder which is solid at ambient temperature and in divided form, the binder being transported and/or stored and/or handled in the form of blocks or pellets of binder that is solid at ambient temperature. The binder that is solid at ambient temperature and in divided form is as described above.

Preferably, the supplemented binder of the invention is transported and/or stored at ambient temperature for a time of greater than or equal to 2 months, preferably 3 months.

According to one embodiment of the invention, the binder which is solid at ambient temperature of the invention is transported and/or stored at a temperature below 80° C. In particular, the transportation and/or storage temperature corresponds to the ambient temperature. The term "ambient temperature" means the temperature which is reached during the transportation and/or storage of the binder according to the invention without said binder being heated via any type of process. Thus, the ambient temperature may reach high temperatures, below 80° C. during the summer periods, in particular in geographical regions with a hot climate.

Advantageously, the ambient temperature is from 5° C. to 70° C., preferably from 10° C. to 70° C., more preferentially from 10° C. to 60° C., even more preferentially from 15° C. to 50° C.

The binders that are solid at ambient temperature and in divided form according to the present invention are noteworthy in that they allow the transportation and/or storage and/or handling of binders at ambient temperature under optimum conditions, in particular without said solid binders undergoing creep during their transportation and/or storage and/or handling, even when the ambient temperature is high and without degrading the properties of the binder, or even improving them.

The binder pellets are preferably transported and/or stored and/or handled in bulk in 1 kg to 100 kg or 500 kg to 1000 kg bags commonly known in the field of road bitumens as "big bags", said bags preferably being made of hot-melt material. They may also be transported and/or stored in bulk in 5 kg to 30 kg cartons or in 100 kg to 200 kg drums.

Use of the Binders that are Solid at Ambient Temperature as Rejuvenating Agent for Bituminous Surfacing Mixes Bituminous surfacing mixes are used as materials for the construction and maintenance of road foundations and of their coating, and also for performing all roadway works. Examples that may be mentioned include surface dressings, hot surfacing mixes, cold surfacing mixes, cold cast surfacing mixes, emulsion gravels, base courses, tie coats, tack coats and wearing courses, and other combinations of a bituminous binder and of the road granulate having particular properties, such as rutting-resistant courses, draining surfacing mixes, or asphalts (mixture between a bituminous binder and granulates such as sand).

In a known manner, the bituminous surfacing mix courses that have been removed from roads or sidewalks, for example, are crushed before being reused. They are referred to as aggregates originating from recycled bituminous mixes. The solid binders according to the invention may be used for the manufacture of new bituminous surfacing mixes from aggregates obtained from recycled bituminous mixes. The solid binders according to the invention have the property of fluidizing the bituminous residues aggregated around the granulates forming the bituminous mixes recycled aggregates, of increasing the adhesiveness of the bituminous composition composed of binder and of bituminous residues and their cohesion around the granulates. The solid binders according to the invention make it possible to reduce the temperature of application of the bituminous surfacing mixes formed from mixes aggregates. By facilitating the mixing and homogenizing of the compositions derived from mixes aggregates, they make it possible to form a bituminous surfacing mix which has a substantially homogeneous composition and mechanical properties that are substantially identical to those of bituminous surfacing mixes obtained solely with bitumen that has never been used for the preparation of bituminous surfacing mixes.

Another subject of the invention relates to a process for manufacturing bituminous surfacing mixes from aggregates obtained from recycled bituminous mixes, this process comprising at least the steps of:

heating the aggregates obtained from recycled bituminous mixes to a temperature ranging from 100° C. to 180° C., preferably from 120° C. to 160° C. in a vessel such as a mixer or a mixing drum, introducing and mixing the solid binder according to the invention, obtaining bituminous surfacing mixes.

The process of the invention has the advantage of being able to be performed without a preliminary step of heating the solid binder pellets.

The process for manufacturing surfacing mixes according to the invention does not require a step of heating the solid binder pellets before mixing with the aggregates obtained from recycled mixes since, on contact with the mixture of hot aggregates, the binder which is solid at ambient temperature melts.

The binder which is solid at ambient temperature according to the invention as described above has the advantage of being able to be added directly to the hot recycled bituminous mixes aggregates, without needing to be melted before being mixed with the recycled bituminous mixes aggregates.

The solid binder in divided form according to the present invention is noteworthy in that it allows the transportation and/or storage of the binder at ambient temperature under optimum conditions, in particular without their being any agglomeration and/or adhesion of the solid binder during its transportation and/or storage and/or handling, even when the ambient temperature is high. Moreover, the presence of the organogelator additives in the mixture of binder and of aggregates obtained from recycled bituminous mixes does not degrade the properties of the bituminous surfacing mixes obtained for a road application, when compared with a non-supplemented binder.

The various embodiments, variants, preferences and advantages described above for each of the subjects of the invention apply to all of the subjects of the invention and may be taken separately or in combination.

The invention is illustrated by the examples that follow, which are given without any implied limitation.

EXPERIMENTAL SECTION

In these Examples, the parts and percentages are expressed on a weight basis unless otherwise indicated.

I—Starting Materials

Oil:
Regenis 50®: RAE oil, i.e. an aromatic oil, sold by the company Total under the brand name Regenis 50®.

Organogelator Agent:
The following was used:
compound A1: 2',3-bis[(3-[3,5-di-tert-butyl-4-hydroxyphenyl]propionyl)]-propionohydrazide (CAS 32687-78-8) sold by the company BASF under the brand name Irganox MD 1024.

Pitch:
The following was used:
A pitch derived from a deasphalting operation by the addition of propane and having a ring-and-ball softening point (RBSP) of 59.6° C. and a penetrability at 25° C. of 14 1/10 mm.

II—Characterization Methods
Penetrability: standard NF EN 1426 at 25° C.
Ring-and-ball softening point (RBSP): standard EN 1427.

III—Preparation of Binder According to the Invention

The binders according to the invention are prepared according to the following general process:

(i) the oil is heated to 170° C.;

(ii) the pitch is introduced into the oil and mixing is performed for 30 minutes with a stirring speed of 400 rpm while keeping the temperature of the 30 mixture equal to 170° C.;

(ii) the organogelator compound is added and mixing is performed for 1 hour at 170° C. with a stirring speed of 400 rpm;

(iii) when the organogelator additive has completely dissolved, the stirring is stopped and the liquid is poured into molds and then left to cool to ambient temperature.

The compositions of binder that is solid at ambient temperature $C_1$ and $C_2$ according to the invention are prepared according to the protocol described above with constituents and proportions (as mass percentages relative to the total mass of the prepared binder compositions) indicated in Table 1 below:

TABLE 1

| | Composition | | |
|---|---|---|---|
| | $C_0$ (comparative) | $C_1$ | $C_2$ |
| Oil | 17% | 17% | 17% |
| Pitch | 83% | 82.2% | 81% |
| Compound A1 | — | 0.8% | 2% |

Compositions $C_1$ and $C_2$ are according to the invention. Composition $C_0$ is comparative.

IV—Preparation of Solid Binder Blocks

The binder compositions prepared above are hot-cast directly into a mold and then left to cool to ambient temperature. After confirming that the compositions have solidified in the mold, the compositions are stripped from the mold to obtain compositions in the form of a block that is solid at ambient temperature.

V—Preparation of Solid Binder Pellets

The pellets $G_0$, $G_1$ and $G_2$ are prepared, respectively, from compositions Co, $C_1$ and $C_2$ according to one of the two equivalent protocols described below.

5.1 General Method for Preparing Pellets of Binder that is Solid at Ambient Temperature The solid binder compositions $C_0$, $C_1$, and $C_2$, prepared previously, are heated at 160° C. for 2 hours in an oven before being poured into a silicone mold having various holes of spherical shape and so as to form binder pellets.

After having confirmed that the binder has solidified in the mold, the surplus is leveled off with a blade heated with a Bunsen burner. After 30 minutes, the solid binder in the form of pellets is stripped from the mold and stored on a plate covered with silicone-treated paper. The pellets are then left to cool to ambient temperature for 10 to 15 minutes.

5.2 General Method for Preparing Pellets of Binder that is Solid at Ambient Temperature with an Industrial Process For the implementation of this method, use may be made of a device and a process as described in great detail in U.S. Pat. No. 4,279,579. Various models of this device are commercially available from the company Sandvik under the trade name Rotoform.

Solid binder pellets may also be obtained from the binder compositions $C_0$, $C_1$ and $C_2$ poured into the reservoir of such a device and maintained at a temperature of between 130 and 180° C.

One or more injection nozzles allow transfer of the binder composition $C_0$, $C_1$, or $C_2$ into the pelletizing twin drum including a rotating outer drum, the two drums being equipped with slits, nozzles and orifices allowing the pelletization of drops of binder through a first fixed drum and orifices with a diameter of between 2 and 8 mm of the rotating outer drum. The drops of binder are deposited on the upper face of a horizontal conveyor belt driven by rollers.

VI—Stability on Storage

This test is performed in order to evaluate the load strength of the binder pellets $G_0$, $G_1$ and $G_2$ prepared above at a temperature of 65° C. under a compression force. Specifically, this test makes it possible to simulate the temperature and compression conditions of pellets on each other to which they are subjected during transportation and/or storage in bulk in 10 to 100 kg bags or in 500 to 1000 kg big bags or in 200 kg drums and to evaluate their resistance under these conditions.

The load resistance test was performed according to the following protocol: 5 ml of pellets are placed in a 20 ml syringe and the plunger is then placed on the pellets along with a 208 g mass, representing an applied force as in a big bag. The whole is placed in an oven at 65° C. for at least 4 hours. The observations are collated in Table 2 below.

TABLE 2

| | Pellets | | |
|---|---|---|---|
| | $G_0$ | $G_1$ | $G_2$ |
| Resistance at ambient temperature at 65° C. | -- | + | ++ |

+++: the pellets conserve their initial form and do not adhere together.
++: the pellets do not adhere together but are slightly deformed.
+: the pellets adhere together slightly.
−: the pellets are partially melted.
−−: the pellets are melted.

The pellets $G_1$ and $G_2$ show very good resistance at an ambient temperature of 65° C. insofar as they adhere together only very little or not at all. The pellets $G_2$ are advantageous in that they do not adhere together at all. Thus, the handling and transportation/storage of said pellets $G_1$ and $G_2$ will be easy insofar as the pellets agglomerate very sparingly, or even not at all at elevated ambient temperature.

The invention claimed is:

1. A binder which is solid at ambient temperature and in divided form, comprising:
   at least one oil chosen from a hydrocarbon-based oil of petroleum or synthetic origin and mixtures thereof,
   at least one pitch, wherein the pitch has a needle penetrability at 25° C. of from 0 to 201/10 mm, measured according to the standard EN 1426,
   from 0.1% to 10% by mass of at least one organogelator chemical additive, the mass percent being relative to the total mass of the binder;
   wherein the organogelator chemical additive is a compound of general formula (I), or of general formula (II) or of general formula (V):

$$Ar1\text{-}R\text{—}Ar2 \qquad (I),$$

in which:
   Ar1 and Ar2 represent, independently of each other, a benzene nucleus or a system of fused aromatic nuclei of 6 to 20 carbon atoms, substituted with at least one hydroxyl group and optionally substituted with one or more $C_1$-$C_{20}$ alkyl groups, and
   R represents an optionally substituted divalent radical, the main chain of which comprises from 6 to 20 carbon atoms and at least one group chosen from amide, ester, hydrazide, urea, carbamate and anhydride functions, $$R\text{—}(NH)_n CONH\text{—}(X)_m\text{—}(NHCO)_p(NH)_n\text{—}R' \qquad (II),$$

in which:
   the groups R and R', which may be identical or different, represent a saturated or unsaturated, linear, branched or cyclic hydrocarbon-based chain, comprising from 1 to 22 carbon atoms, optionally substituted with one or more hydroxyl groups or amine groups, and optionally comprising heteroatoms and R' may be H;
   the group X represents a saturated or unsaturated, linear, cyclic or branched hydrocarbon-based chain, comprising from 1 to 22 carbon atoms, which is optionally substituted, and optionally comprising heteroatoms;
   n, m and p are integers having a value of 0 or 1, independently of each other, $$R''\text{—}(COOH)_z \qquad (V),$$

in which:
   R" represents a linear or branched, saturated or unsaturated chain comprising from 4 to 68 carbon atoms, and
   z is an integer ranging from 2 to 4.

2. The binder as claimed in claim 1, in which the hydrocarbon-based oil is chosen from hydrocarbon-based oils of petroleum origin.

3. The binder as claimed in claim 1, in which the hydrocarbon-based oil is chosen from aromatic oils with a content of aromatic compounds of between 30% and 95% by mass, relative to the total mass of the aromatic oil.

4. The binder as claimed in claim 3, in which the hydrocarbon-based oil is chosen from aromatic oils with a content of aromatic compounds of between 50% and 95% by mass, relative to the total mass of the aromatic oil.

5. The binder as claimed in claim 3, in which the aromatic oil has a kinematic viscosity at 100° C. of between 0.1 and 150 mm²/s.

6. The binder as claimed in claim 1, in which the hydrocarbon-based oil is chosen from liquid paraffins with a total content of paraffinic compounds of at least 50% by mass relative to the total mass of the liquid paraffin.

7. The binder as claimed in claim 1, in which the pitch has a penetrability at 25° C. ranging from 5 to 20 1/10 mm.

8. The binder as claimed in claim 7, in which the pitch has a ring-and-ball softening point (RBSP) measured according to the standard EN 1427, ranging from 55° C. to 110° C.

9. The binder as claimed in claim 1, in which the organogelator compound has a molar mass of less than or equal to 2000 g·mol⁻¹.

10. The binder as claimed in claim 1, which comprises from 0.2% to 5% by mass of organogelator additive relative to the total mass of the binder.

11. The binder as claimed in claim 10, which comprises from 0.5% to 3.5% by mass of organogelator additive relative to the total mass of the binder.

12. The binder as claimed in claim 1, wherein the organogelator chemical additive is the compound of the general formula (I):

$$Ar1\text{-}R\text{---}Ar2 \qquad (I),$$

in which:
Ar1 and Ar2 represent, independently of each other, a benzene nucleus or a system of fused aromatic nuclei of 6 to 20 carbon atoms, substituted with at least one hydroxyl group and optionally substituted with one or more $C_1$-$C_{20}$ alkyl groups, and R represents an optionally substituted divalent radical, the main chain of which comprises from 6 to 20 carbon atoms and at least one group chosen from amide, ester, hydrazide, urea, carbamate and anhydride functions.

13. The binder as claimed in claim 12, wherein the organogelator chemical additive is 2',3-bis [(3-[3,5-di-tert-butyl-4-hydroxyphenyl]propionyl)]propionohydrazide.

14. The binder as claimed in claim 1, which comprises:
10% to 70% by mass of at least one oil chosen from: hydrocarbon-based oils of petroleum or synthetic origin,
10% to 85% by mass of at least one pitch,
0.1% to 10% by mass of at least one organogelator chemical additive,
0% to 10% by mass of one or more other additives, relative to the total mass of the binder.

15. The binder as claimed in claim 1, in the form of pellets or blocks.

16. The binder as claimed in claim 1 wherein it is part of a kit comprising at least:
one binder which is solid at ambient temperature as claimed in claim 1,
one capsule comprising at least one additive.

17. A process for preparing a binder which is solid at ambient temperature as claimed in claim 1, comprising:
(i) mixing the oil and the pitch, and heating to a temperature of between 140 and 200° C.,
(ii) adding the organogelator compound, mixing and heating to a temperature of between 140 and 200° C.,
(iii) optionally adding one or more other additives, mixing and heating to a temperature of between 140 and 200° C.,
(iv) shaping the composition,
(v) cooling to ambient temperature.

18. A process for transporting or storing or handling a binder, wherein said method comprises:
a step consisting of preparing the binder composition, which is solid at ambient temperature and in divided form as claimed in claim 1, and
a step in which the binder is transported or stored or handled in the form of blocks or pellets which are solid at ambient temperature.

* * * * *